US012738654B2

(12) United States Patent

Kausar et al.

(10) Patent No.: US 12,738,654 B2
(45) Date of Patent: Sep. 15, 2026

(54) FLAT PANEL ANTENNA

(71) Applicant: SN Space Systems Limited, Long Beach, CA (US)

(72) Inventors: Shafaq Kausar, Artesia, CA (US); Ninh Le, Huntington Beach, CA (US); Erik Fountain, Irvine, CA (US)

(73) Assignee: SN Space Systems Limited, Long Beach, CA (US)

( * ) Notice: Subject to any disclaimer, the term of this patent is extended or adjusted under 35 U.S.C. 154(b) by 179 days.

(21) Appl. No.: 18/532,374

(22) Filed: Dec. 7, 2023

(65) Prior Publication Data

US 2024/0195071 A1 Jun. 13, 2024

Related U.S. Application Data

(60) Provisional application No. 63/430,945, filed on Dec. 7, 2022.

(51) Int. Cl.

| | |
|---|---|
| ***H01Q 15/00*** | (2006.01) |
| ***H01Q 3/34*** | (2006.01) |
| ***H01Q 9/04*** | (2006.01) |
| ***H01Q 21/06*** | (2006.01) |

(52) U.S. Cl.
CPC ............ *H01Q 9/0407* (2013.01); *H01Q 3/34* (2013.01); *H01Q 15/0086* (2013.01); *H01Q 21/065* (2013.01)

(58) Field of Classification Search
CPC .. H01Q 3/34–36; H01Q 15/14; H01Q 21/065; H01Q 15/0086
See application file for complete search history.

(56) References Cited

U.S. PATENT DOCUMENTS

| | | | | | |
|---|---|---|---|---|---|
| 5,148,182 | A * | 9/1992 | Gautier | H01Q 15/14 343/846 |
| 10,594,032 | B2 * | 3/2020 | Rmili | H01Q 3/32 |
| 11,385,326 | B2 * | 7/2022 | Völkel | H01Q 15/0086 |
| 2019/0326670 | A1 * | 10/2019 | Pelletti | H01Q 15/0086 |
| 2023/0275348 | A1 * | 8/2023 | Pinto | H01Q 21/065 343/702 |

* cited by examiner

*Primary Examiner* — Hasan Islam
(74) *Attorney, Agent, or Firm* — Macheledt Bales LLP; Jennifer L. Bales

(57) ABSTRACT

A flat panel antenna fed by a planar feed array and steered by varactors performs the function of a single beam phased array antenna. This flat panel antenna has a planar array to passively amplify radio frequency (RF) signals, and a transmitarray metasurface having an array of unit cells to steer the antenna's main beam. It uses varactors to dynamically control the phase shift for each unit cell.

18 Claims, 14 Drawing Sheets

100

FLAT PANEL ANTENNA

BACKGROUND OF THE INVENTION

Field of the Invention

The present invention relates to flat panel antenna electronically steered by varactors (variable capacitors) serving as voltage controlled phase shifters.

Discussion of Related Art

Phased array antennas can provide high gain for wireless applications like telecommunications through satellites in low earth orbit. Phased array antennas typically use active phase shifters to instantaneously repoint their beams. Phase shifters are often expensive and power hungry, making them doubly expensive on a satellite where electricity is very expensive.

SUMMARY OF THE INVENTION

A flat panel antenna fed by a planar feed array and steered by varactors performs the function of a single beam phased array antenna. This flat panel antenna has two parts:

1. a planar array to passively amplify radio frequency (RF) signals, and
2. a transmitarray metasurface to steer the antenna's main beam.

Like any typical phased array antenna, this flat panel antenna changes the phase distribution of unit cells (omnidirectional antennas also known as elements) across its transmitarray metasurface to electronically point the antenna's beam in a desired direction. Progressive phase distribution on the transmitarray metasurface causes the main beam to scan in the desired direction. The main beam can be steered between ±60° in elevation with full azimuth coverage.

In contrast to other phased array antennas, this antenna uses varactors to dynamically control the phase shift for each unit cell. Varactors are inexpensive and they use little power. As a result, this flat panel antenna electronically steered by varactors is inexpensive and almost completely passive.

A steerable antenna has a feed array configured to generate plane waves, a metasurface comprising an array of unit cells, a bias layer, and vias connected to the bias layer and passing through the unit cell layers. A unit cell comprises multiple spaced-apart unit cell layers, each unit cell layer having a substrate and a conductive overlay including at least one variable capacitor (varactor). The bias layer separately controls the varactor capacitances. This allows each unit cell to independently shift the phase of electromagnetic waves.

Some embodiments form a low profile antenna by having a planar feed array parallel to the metasurface. The feed array and the metasurface can be close together, even as close a distance as the longest wavelength the steerable antenna is configured to amplify. The distance may be less than the thickness of the metasurface, or the metasurface plus the bias layer.

The metasurface, and hence the unit cells, have multiple spaced-apart layers, for example four layers. Each layer includes a substrate, and conductive overlays corresponding to the unit cells. In some embodiments the unit cell layers are separated by a distance on the order of ¼ of the longest wavelength the steerable antenna is configured to amplify.

The unit cell conductive overlays may comprise an outer copper ring and an inner copper ring, and have the varactor inserted between the outer copper ring and the inner copper ring. More than one varactor may be used. If four are used, linear and circular polarization can be accomplished.

In some embodiments, a varactor assembly comprises a variable capacitance diode and a second capacitor, and the bias layer changes DC voltage across the second capacitor, and the capacitance of the variable capacitance diode controls unit cell steering.

In some embodiments the bias layer includes a micro controller, and a single DAC feeding at least one switch, and the switch attaches to the varactors.

The bias layer may include a patch array where the patches include an RF choke having a radial stub and a ¼λ transmission line.

BRIEF DESCRIPTION OF THE DRAWINGS

FIG. 4A shows a periodic view of an array of unit cells. FIG. 4B shows a front view of one unit cell. FIG. 4C shows a side view with vias and bias layer. FIG. 4D shows a perspective view of a metasurface unit cell and bias layer. FIG. 4E shows a varactor arrangement to support both linear and circular polarization.

FIG. 5A shows the transmission coefficient phase. FIG. 5B shows transmission coefficient amplitude.

DETAILED DESCRIPTION OF THE INVENTION

Figure 1:
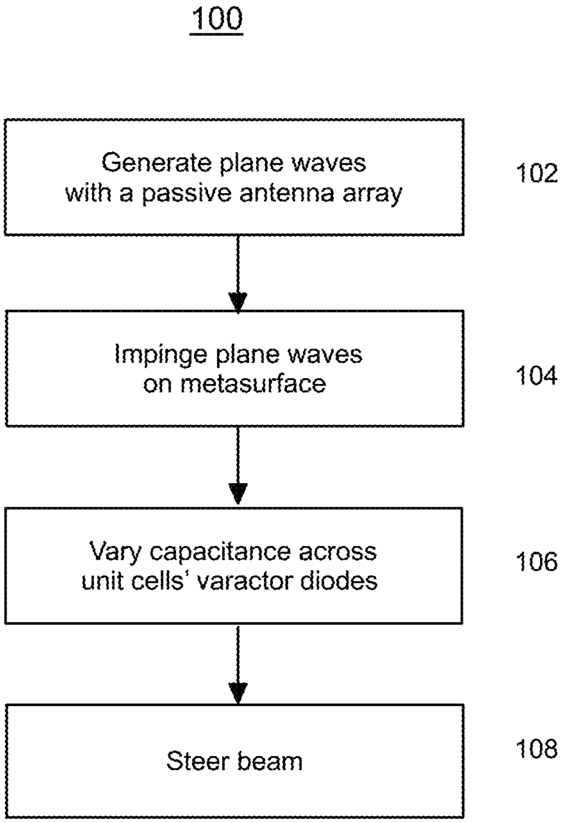
FIG. 1 is a flow diagram illustrating the operation of a flat panel array.

To give the antenna 200 a low profile, a high efficiency planar feed 206 is used to space feed the transmitarray metasurface assembly 208, comprising several metasurface layers 202. Spatial feeding between a planar feed source 206 and the metasurface 208 avoids the losses associated with a power distribution network. (A power distribution network is the normal way to make an electronically steered antenna flat.) Electromagnetic waves from the feed 206 energize the metasurface unit cells 402, and vice versa. A planar wave feed 206 excites the unit cells 402 so that electromagnetic waves impinge all unit cells 402 at the same time without any path delay differences. This feed mechanism improves illumination efficiency because it produces both negligible edge taper and negligible spillover, two design parameters which space fed antennas normally trade between. The size of the feed array 206 is comparable to the size of the transmitarray metasurface 208. The thickness of the antenna 200 (a parameter generally dominated by the distance 212 between the feed source 206 and the metasurface 208) is comparable to the longest wavelength that the antenna 200 amplifies.

The transmitarray metasurface 208 consists of tunable unit cells 402. Unit cells 402 comprise unit cell layers 404 printed on substrates 412, making a transmitarray metasurface layer 202 physically not much more than a printed circuit board (PCB). The substrate 412 can be flexible to create a conformal phased array antenna 200 if so desired. Each unit cell 402 consists of multiple PCB layers 404 separated by a distance of about ¼th of the wavelength. Each layer 404 consists of concentric resonating copper rings 406 and 408 printed on dielectric substrate 411, 412. Many multi-layered unit cells 402 are arranged next to each other to create the transmitarray metasurface 208. To increase the pass band of the transmitarray 208, unit cells 402 resonating at vastly different receive and transmit frequencies can be interlaced (typically in a checkerboard pattern) so that a single aperture can receive and transmit signals simultaneously at different center frequencies.

To dynamically control each unit cell 402, varactor diodes 410 are placed between the inner copper ring 408 and the outer copper ring 406 of each layer 404 of the unit cell 402. Each unit cell 402 can be independently biased, resulting in a programmable phase shift. A single unit cell 402 may have multiple varactor diodes 410 loaded between the inner and outer copper rings at each layer. The varactor diode 410 provides a variable capacitance, which in turn changes the phase of the transmission coefficient. Hence, electromagnetic waves passing through each unit cell 402 can be manipulated by controlling the capacitance of one or more varactor diodes 410. In this fashion, each unit cell acts like a tunable phase shifter. Varying the voltage (typically between 0 Volts and 20 Volts) across a varactor diode 410 causes the unit cell 402 to produce a phase shift (ideally between 0° and 360°).

Advantages of the Invention

- Compact and low-profile antenna 200 that consumes negligible electricity
- Instantaneous beam repointing without the time delays or vibrations of a mechanical assembly
- Cost effective solution due to low-cost phase shifting mechanism
- Simpler architecture due to the absence of complicated beam-forming networks
- Proposed configuration can support both linear and circular polarization
- Simplified varactor control module with low voltage error FIG. 1 is a flow diagram 100 illustrating the operation of the flat panel array 200 in the transmit direction. In the first step 102, a passive antenna array 206 generates plane waves and thus act like a feed source to excite a metasurface assembly 208. In the second step 104, electromagnetic waves from a plane wave source 206 impinge on a metasurface 208. The metasurface 208 consists of multi-layered unit cells 402. Each layer consists of slotted patch 408 loaded with a varactor diode 410. In the third step 106, varying the capacitance across the unit cell's varactor diode 410 results in a corresponding phase shift of the transmitted electromagnetic signal and thereby in step 108 steers a beam in a desired direction.

Figure 2:
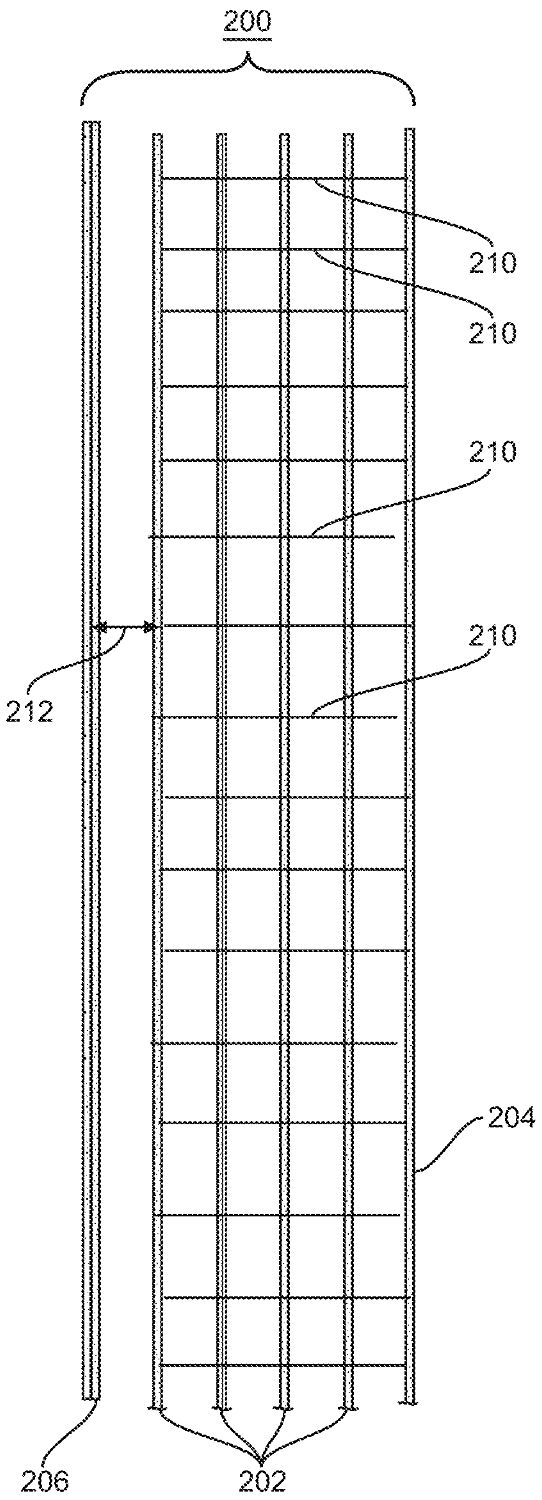
FIG. 2 shows a metasurface integrated with a planar feed array (side view).

FIG. 2 shows a side view of metasurface assembly 208 integrated with a planar feed array 206 (side view). In this example, metasurface assembly 208 comprises four metasurface layers 202 and a bias layer 204. Feed array 206 is disposed a distance 212 apart from metasurface assembly 208. Vias 210 connect the metasurface layers 202. In particular, a via connects each unit cell layer 404 within a unit cell 402 (see FIG. 4D).

Figure 3:
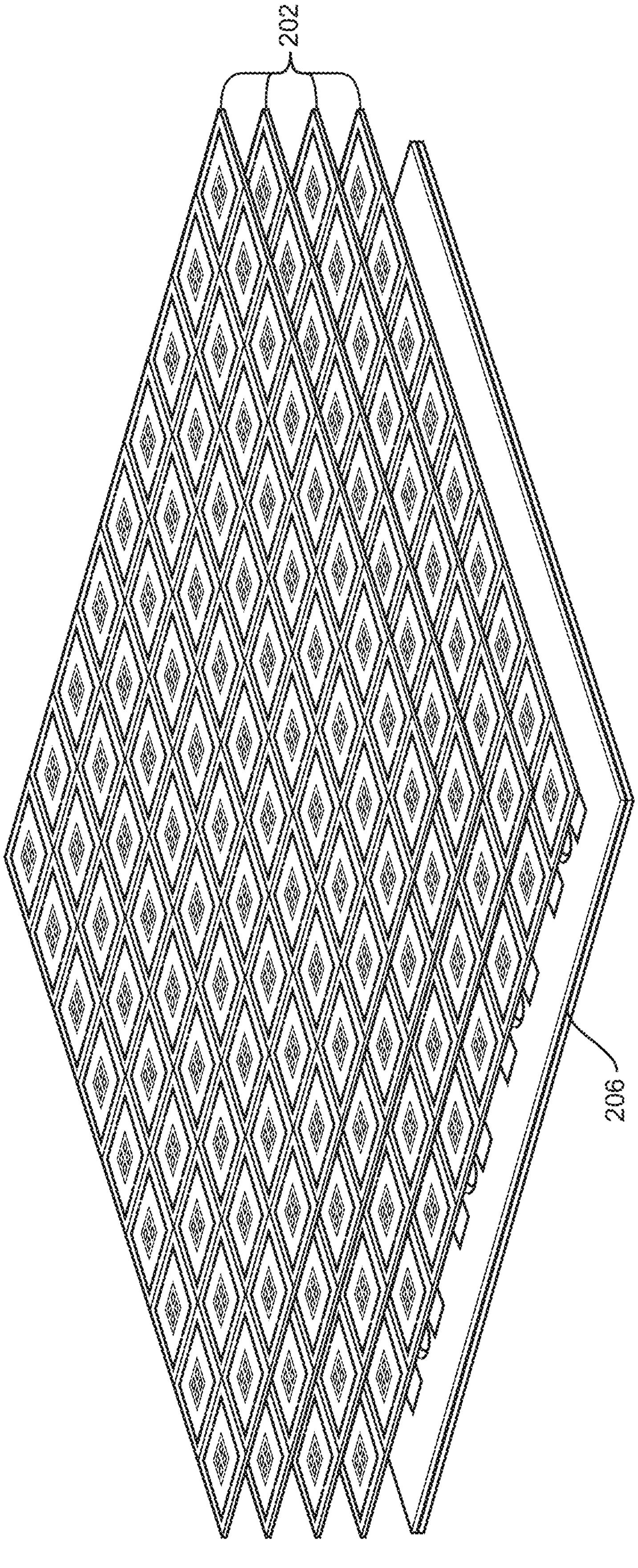
FIG. 3 shows an isometric view of the metasurface and its feed array.

FIG. 3 shows an isometric view of the metasurface assembly 208 and feed array 206. Each metasurface layer comprises an array of unit cells.

The starting point in the design of the tunable metasurface array 208 is unit cell 402 modeling. The unit cell 402 needs to cover a wide phase range of around 360 degrees with low insertion loss. Multi-layered unit cell 402 structures offer a wide phase range compared to the single-layered unit cell.

Figure 4A:
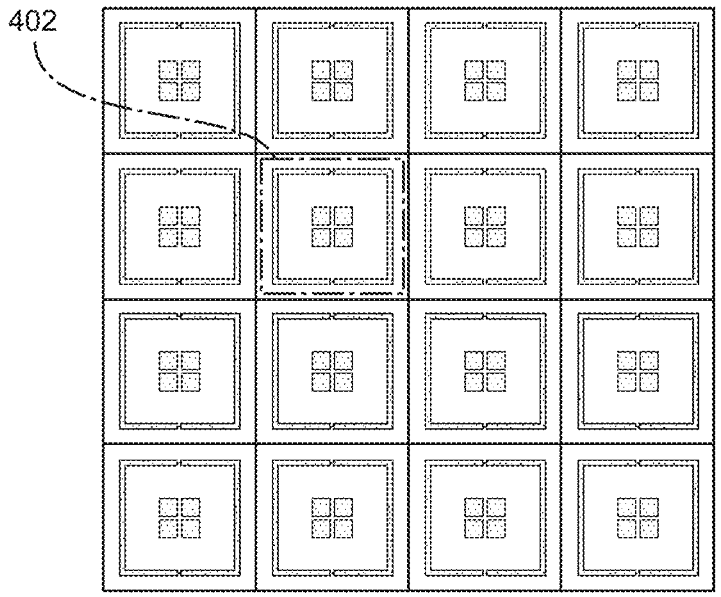
FIGS. 4A, 4B, 4C, 4D, and 4E are schematic diagrams illustrating the geometry of a metasurface unit cell.
Figure 4B:
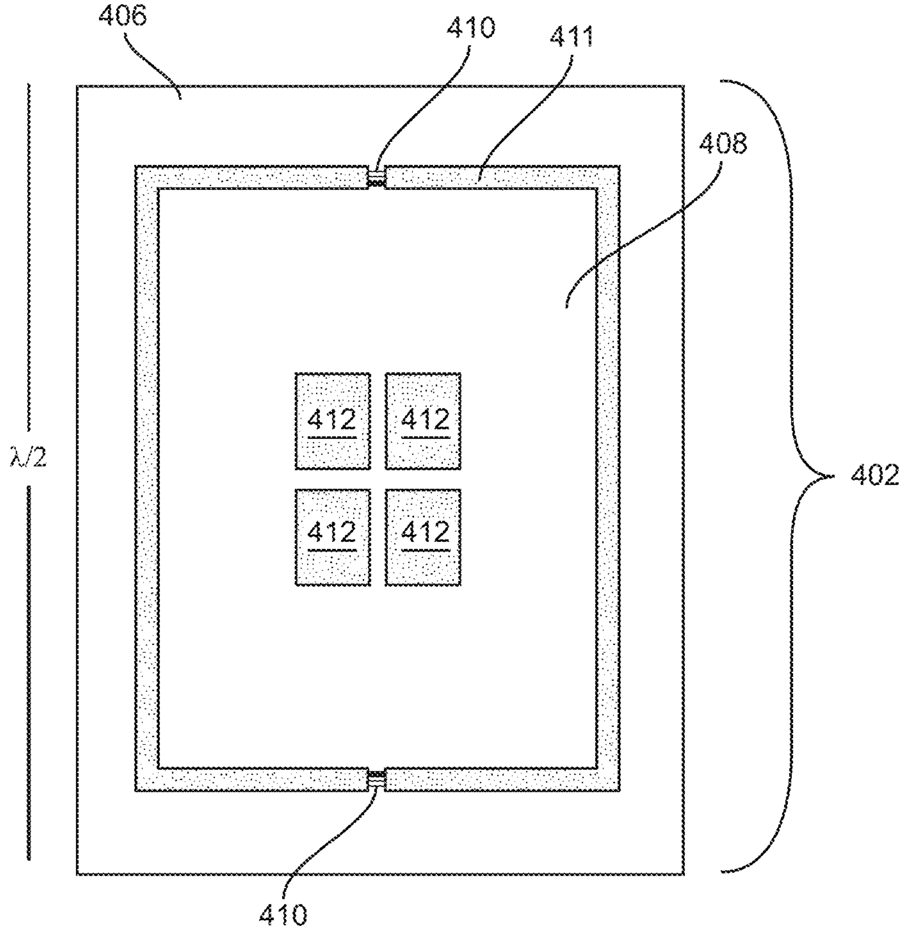
Figure 4C:
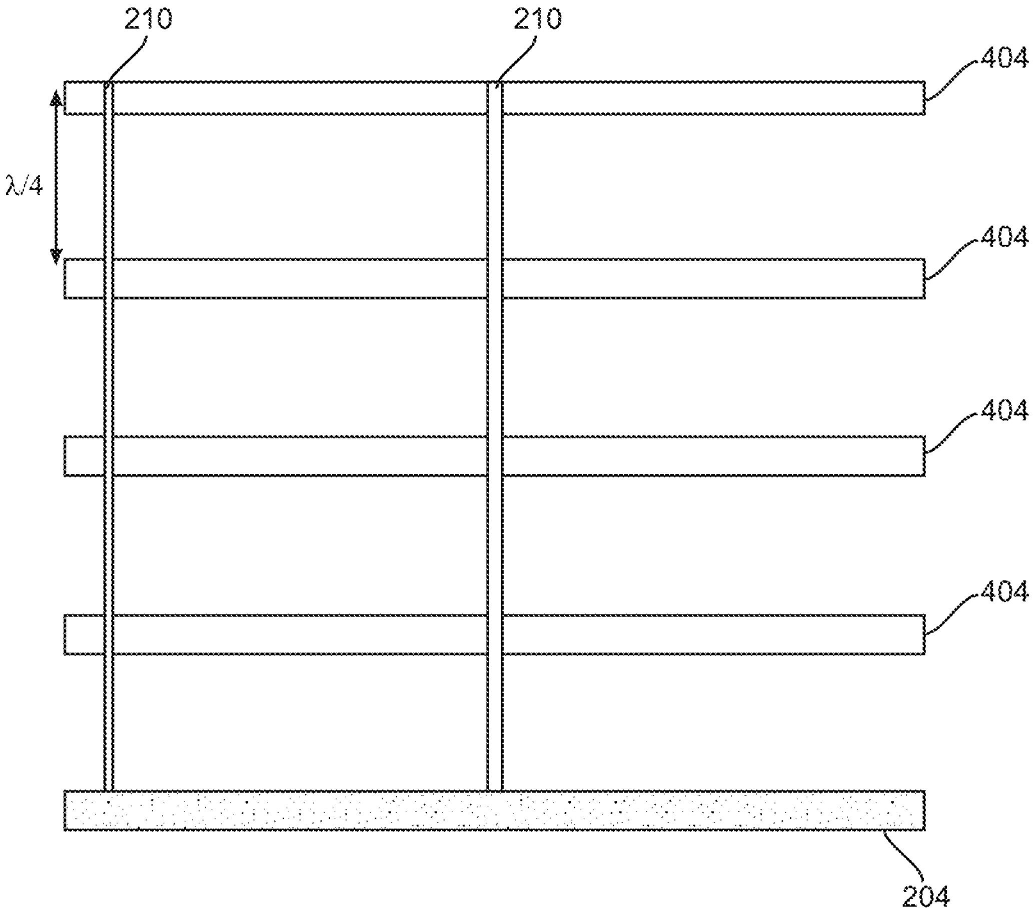
Figure 4D:
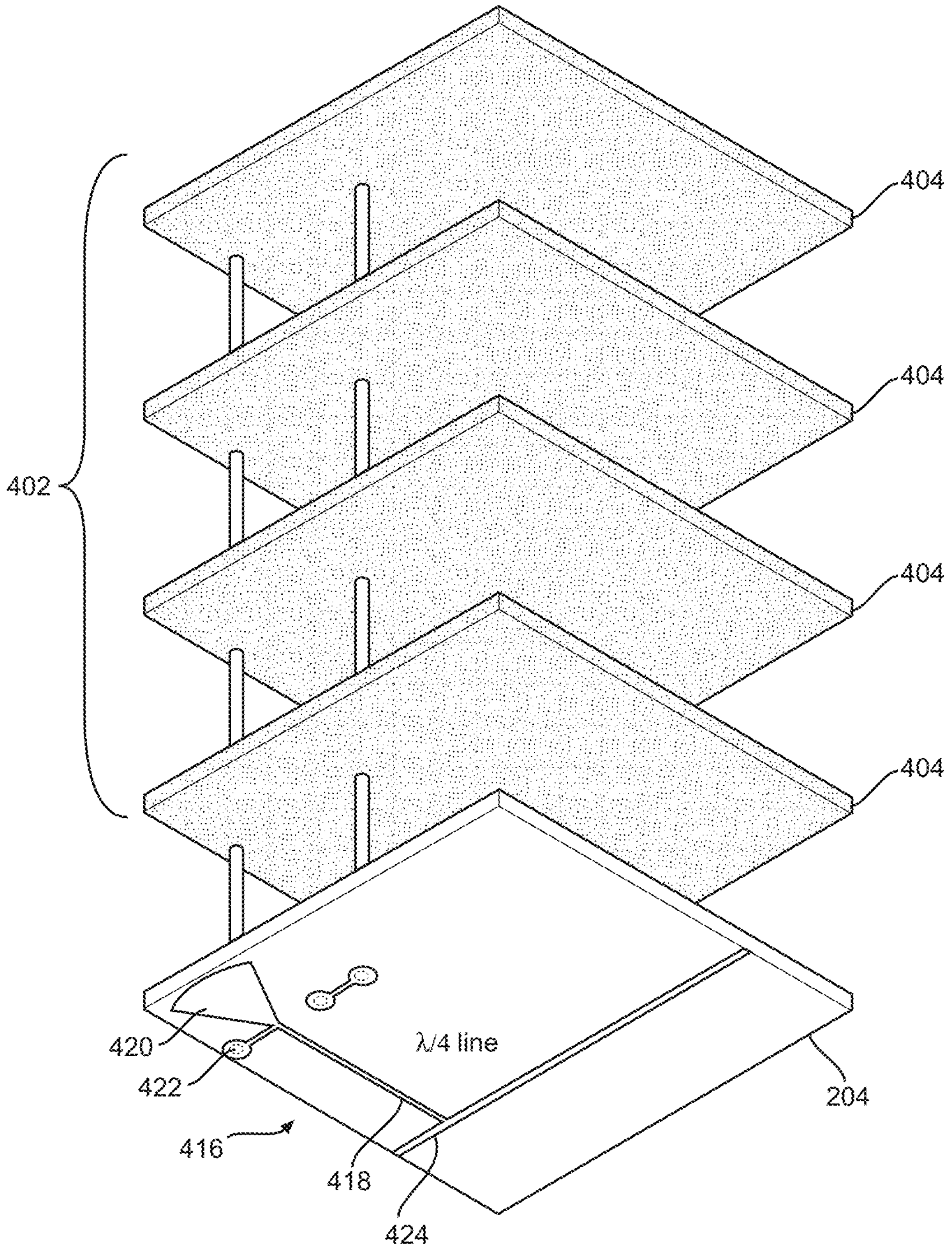

In our example, we consider a four layer 404 unit cell 402 to have a reasonable tradeoff between performance and antenna mass. FIGS. 4A, 4B, 4C, and 4D are schematic diagrams illustrating the geometry of a metasurface unit cell. FIG. 4A shows a periodic view. FIG. 4B shows a front view. FIG. 4C shows a side view of a four layer 404 unit cell 402 with vias 210 and a portion of the bias layer 204. FIG. 4D shows a perspective view of the four layer 404 unit cell 402 and a portion of bias layer 204 with a radio frequency (RF) choke 416, consisting of a radial stub 420 and a quarter wavelength transmission line 418. Via 422 is for biasing using bias line 424. Spacing between adjacent layers is approximately ¼ wavelength.

Figure 4E:
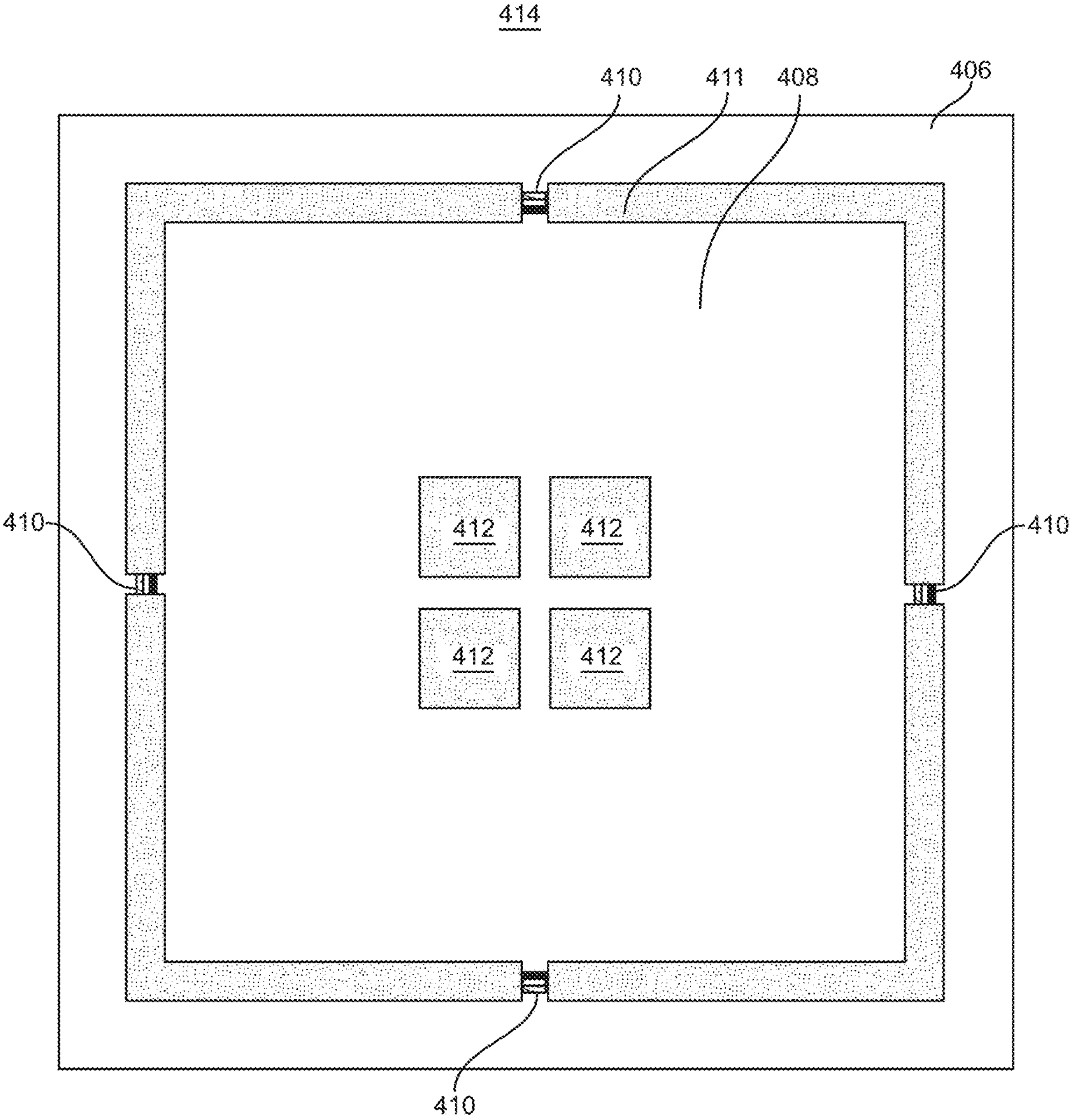

A four layer 404 unit cell 402 structure offers a reasonable tradeoff between performance and mass. There are numerous ways to design the unit cell. In this example, the unit cell geometry consists of an outer slotted copper ring 406 and an inner slotted quad patch 408. In each layer, a pair of varactor diodes 410 (voltage-controlled capacitance) is added between the outer slotted ring 406 and the inner quad parch 408 to dynamically tune the unit cell 402 phase response. The designed geometry can support both circular polarization and linear polarization. As shown in FIG. 4E, four varactors 410 (instead of a single varactor pair) can be used to attain quad symmetry to support circular polarization.

The top layer contains a bias network 204, as seen in FIG. 4D. (FIGS. 4C and 4D are drawn upside down from the perspective of a VSAT antenna, but right side up from the perspective of a satellite antenna pointed at Earth.) The biasing layer provides DC biasing to the varactor diodes located on the four transmitarray layers. A novel RF choke network based on a differential transmission line was used for this purpose. The RF choke network consists of a high impedance quarter wavelength transmission line 418 and a radial stub 420. The connecting bias line 422 provides DC connectivity in the array. Through-hole through-layer vias 210 connect all 4 active metamaterial layers 202 to a feeding plane (bias layer) in a fifth layer. This configuration allows all elements to be independently controlled.

Figure 5A:
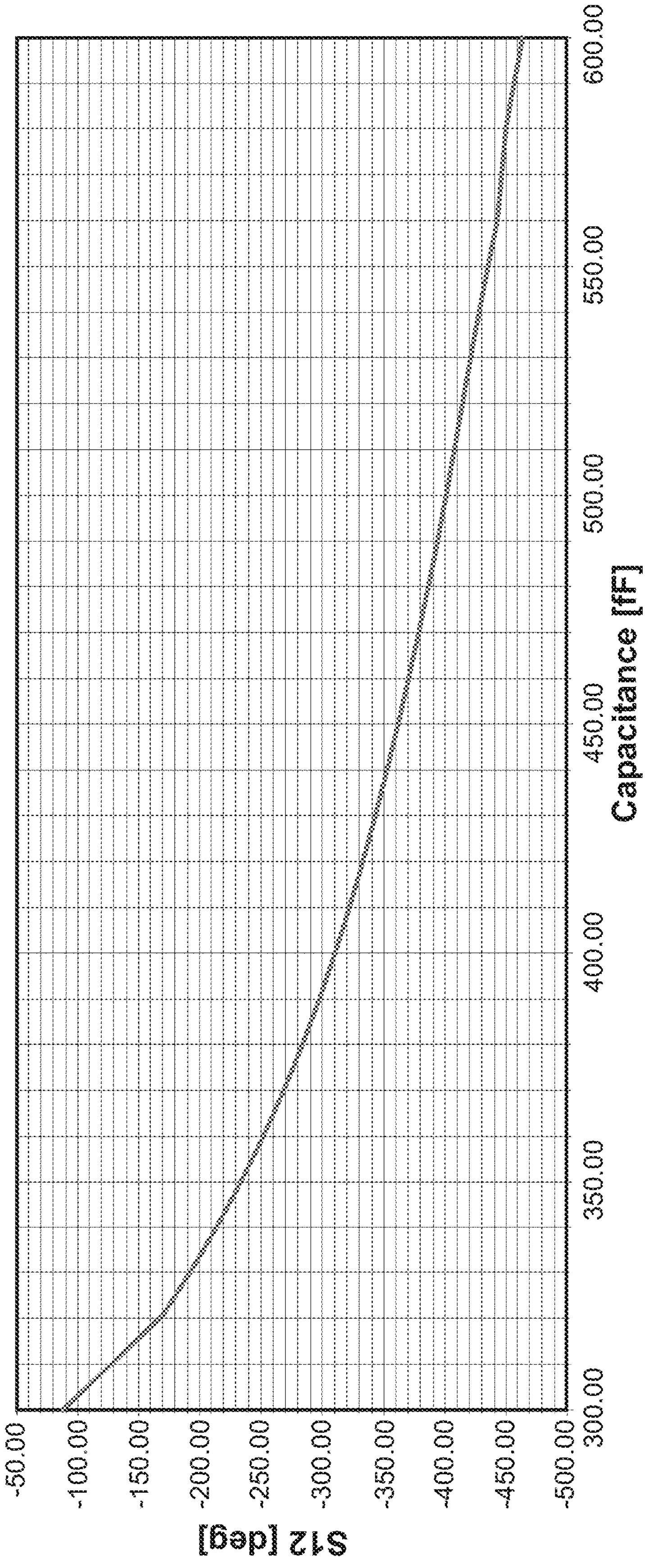
FIGS. 5A and 5B are plots showing unit cell transmission performance.
Figure 5B:
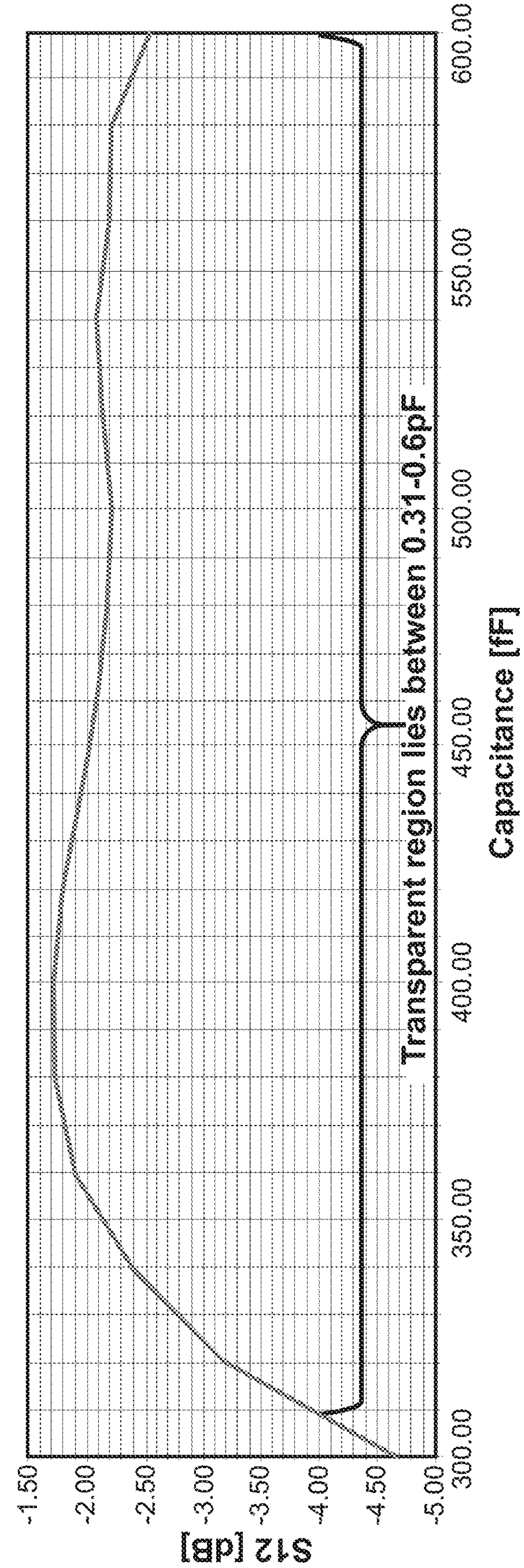

The transmission coefficient phase vs. diode capacitance has been studied to analyze the phase response of the unit cell 402. In this example, by tuning varactor diodes 410 between 0.31 pF to 0.6 pF, we achieved the phase agility of 360°. FIGS. 5A and 5B are plots showing unit cell 402 transmission performance. FIG. 5A shows transmission coefficient phase. FIG. 5B shows transmission coefficient amplitude. FIGS. 5A and 5B show the unit cell 402 transmission coefficient as a function of diode 410 capacitance. In this example, the average transmission coefficient magnitude for the designed unit cell 402 is below 2.2 dB and the average return loss is better than 15 dB. The insertion loss of a unit cell 402 depends on the resistance of the varactor diodes 410. Low resistance varactors 410 can produce lower insertion losses. A pair of parallel varactors 410 can also be used to reduce the varactor's resistance, resulting in increased antenna efficiency.

Figure 6:
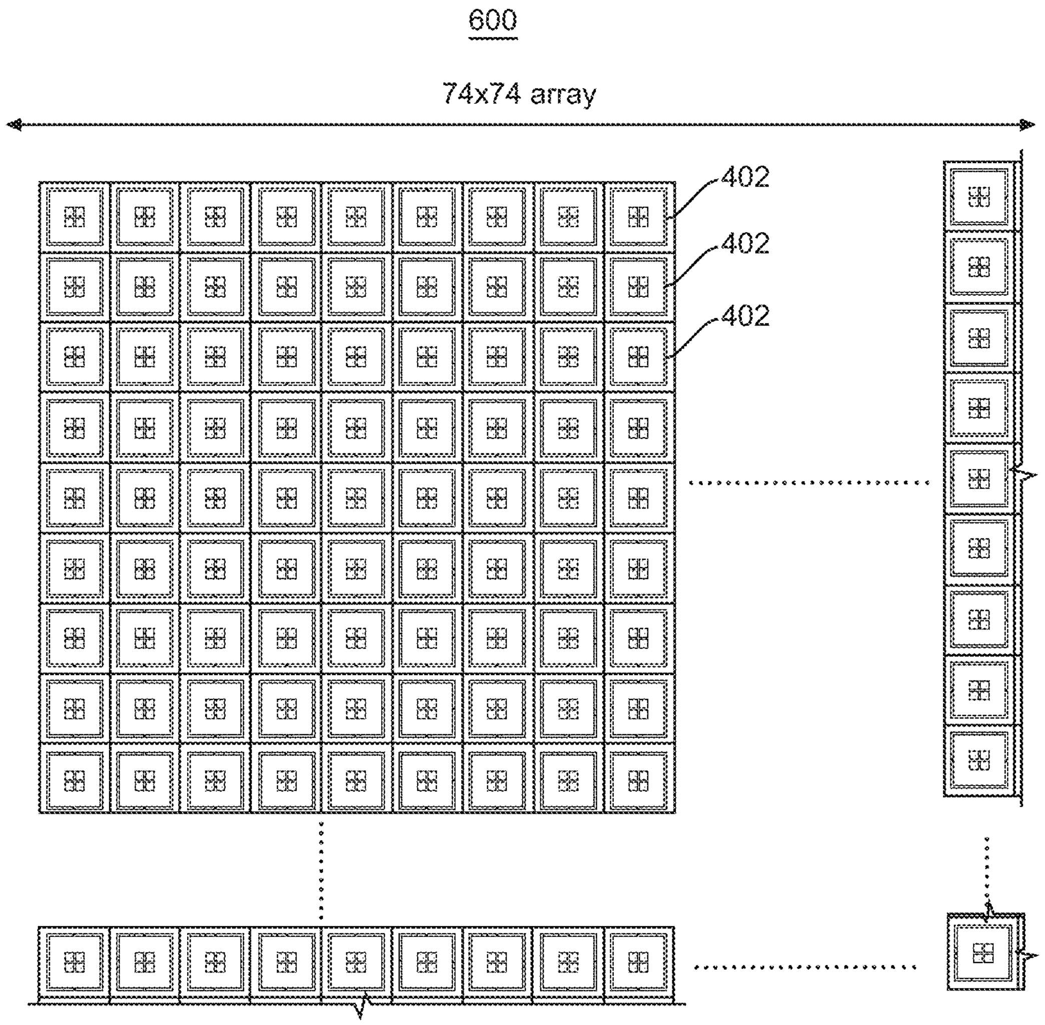
FIG. 6 is a top view of a multilayer metasurface.

FIG. 6 is a top view of a multilayer metasurface 208. To validate the dynamic tuning capabilities of the designed unit cell, a 74×74 element 402 array 600 has been designed at 11 GHz. FIG. 6 shows a portion of the designed surface. To maintain the image quality, only a small portion of the array is shown in the figure. The size of the 74×74 element array has been arbitrarily chosen as an example.

Each unit cell 402 in the 74×74 element array 600 consists of 4 layered metasurface 202 and a 5th bias layer 204. Each active layer 202 includes varactor diodes 410 for dynamic tuning. One single tuning voltage will bias all diodes 410 in all layers 404 of a unit cell 402 to provide a 0.31-0.6 pF capacitance range. To provide this capacitance range, the tuning voltage is programmable over a range of approximately 0V to 20V, with a suitably fine voltage step size to provide small capacitive tuning increments. As shown in FIGS. 4B and 4E, each cell layer 404 includes two embedded varactors 410 (for linear polarization) or four varactors 410 for linear and circular polarization. All varactors 410 in each element are driven by a common tuning voltage. Thus, a 74×74 element array requires 5476 independently controlled digital voltage sources.

Figure 7:
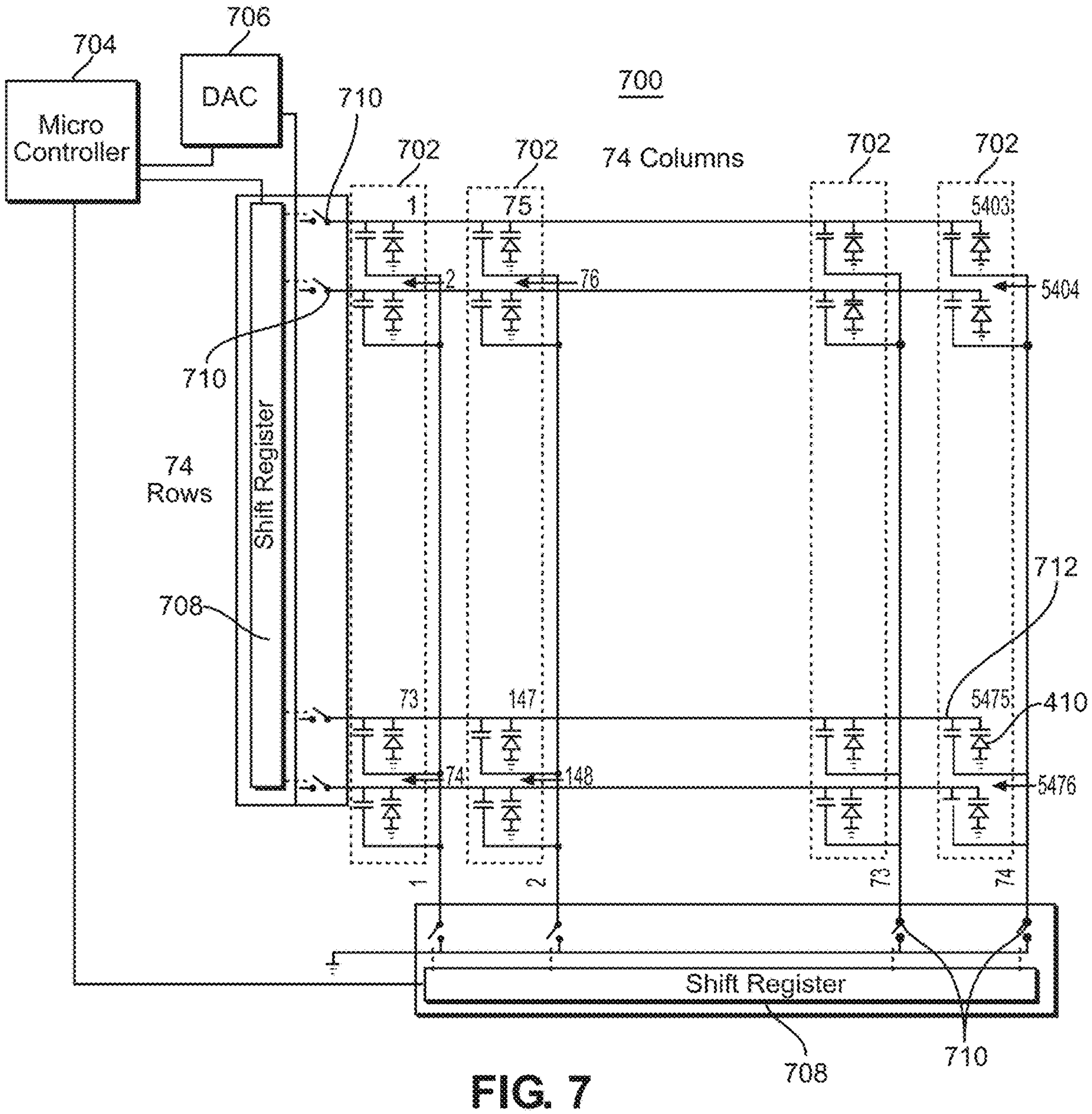
FIG. 7 is a schematic diagram illustrating the metasurface control architecture.

There are several ways to build a digitally tuned voltage source, conventionally involving multiple tuning digital to analogue converters (DACs). FIG. 7 shows one simple digitally tuned voltage source 700 for controlling the varactor diode 410 voltage in each antenna unit cell 402. One single DAC 706 is used to distribute pre-determined voltages to every capacitor 712 placed across each varactor 410. Using one single DAC 706 eliminates errors that using multiple DACs may introduce. A single DAC 706 ensures all voltages accurately track, eliminating random errors. An array of switches 710 controlled by shift registers 708 is used in a scanned arrangement to provide the voltage distribution. All array elements can be individually controlled by micro controller 704 to scan the beam towards its intended direction.

Until now we have discussed the metasurface 208 design and control mechanism 700 for varactor diodes 410. Next, we will discuss the excitation of the metasurface array 208 via spatial feeding by feed array 206.

To keep the antenna 200 profile low, we devised a novel feeding mechanism where a feed source/exciter 206 can be placed in proximity to the metasurface 208. Instead of a focal point source, an array is used to uniformly illuminate the metasurface in the near field with a plane wave excitation. We propose using a high efficiency feed since a high efficiency feed keeps the overall efficiency of the antenna higher. The size of the feed array 206 is equal to the size of the metasurface 208. Unlike a conventional focal point source, the separation 212 between the feed array 206 and the metasurface 208 in our implementation is independent of aperture size. So, a very small separation 212 is selected to achieve a low-profile design. FIG. 2 shows the side view of a metasurface integrated with a planar feed.

Figure 8:
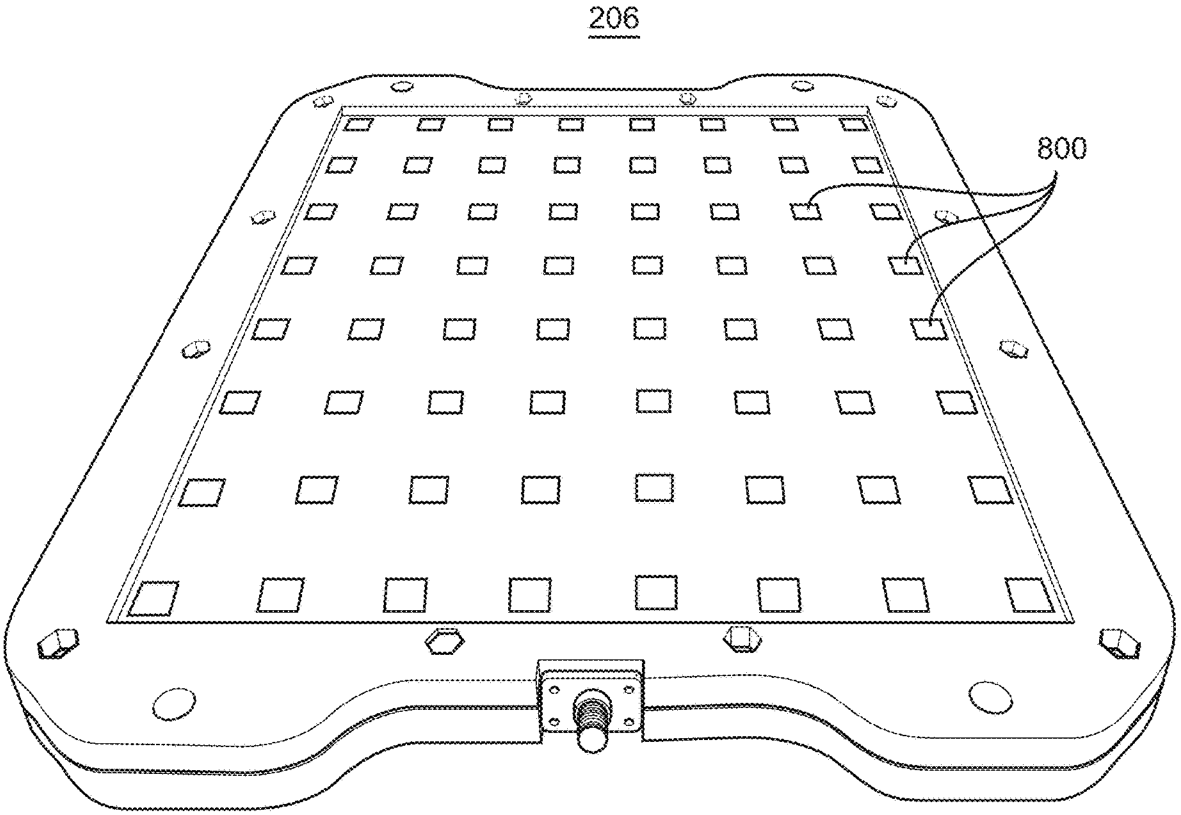
FIG. 8 shows the planar feed array.
Figure 9:
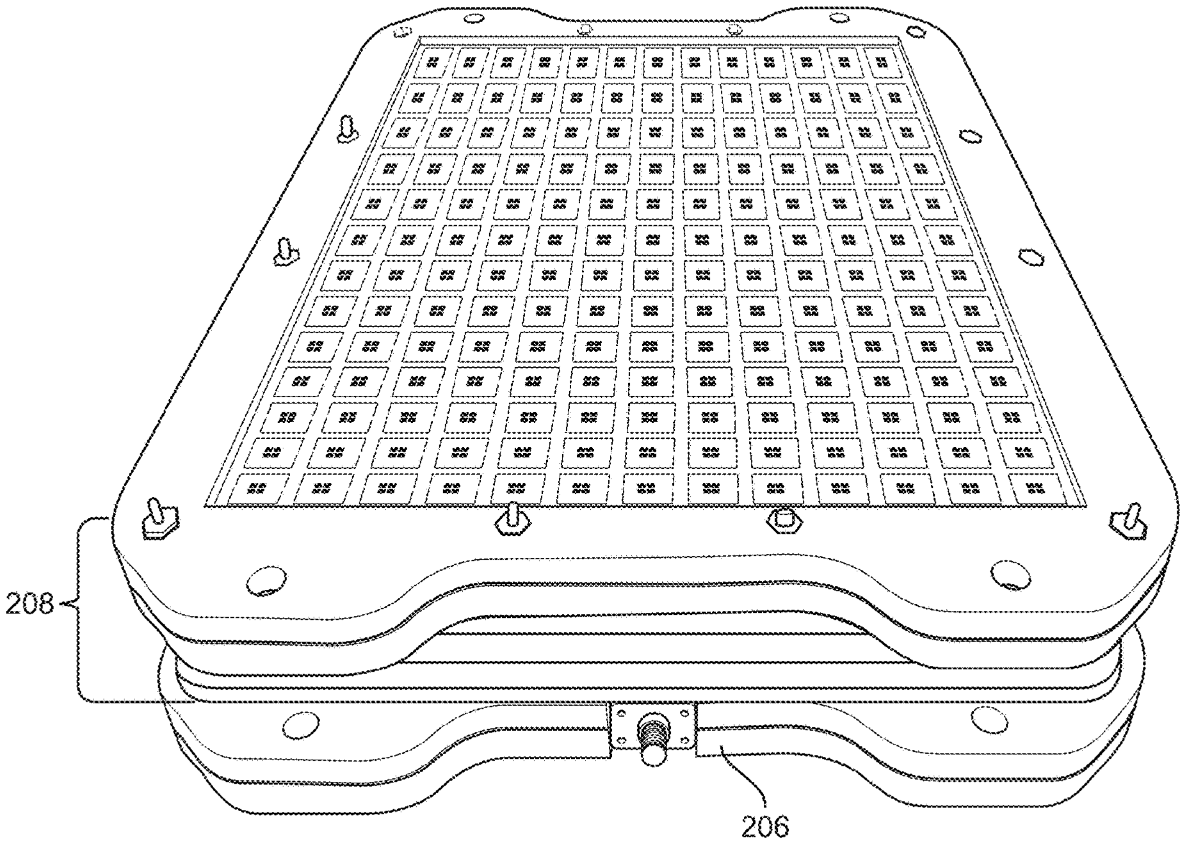
FIG. 9 shows the metasurface integrated with the feed array.

FIG. 8 shows an example of a planar feed array. The feed is a proximity coupled patch array 206, 800. Proximity coupling has been employed to achieve higher antenna efficiency by suppressing spurious radiations. FIG. 9 shows a metasurface 208 integrated with a planar feed source 206. In this example, the feed 206 and metasurface 208 size (8×8) is smaller than the aforementioned 74×74 element array of FIG. 6 because array size can be scaled up or down based on gain requirements.

According to the aperture phase distribution given in the following equation, the varactor diode 410 can be tuned to provide the required phase compensation to form a beam toward its intended direction. Each unit cell 402 acts like a phase shifter and adds the phase shift to the incident signal as given below:

$$\mathcal{P}_i = k_o(x_i \sin\theta_r \cos\varnothing_r + y_i \sin\theta_r \sin\varnothing_r)$$

where $k_o$ is the free space propagation constant, $(x_i, y_i)$ are coordinates of the $i_{th}$ element, and $(\theta_r, \varnothing_r)$ show the desired beam direction.

The metasurface 208 is tuned to steer a beam from 0° to ±60° by adjusting the capacitive loading of unit cells 402 using varactor diode 410 between 0.31-0.6 pF.

Figure 10:
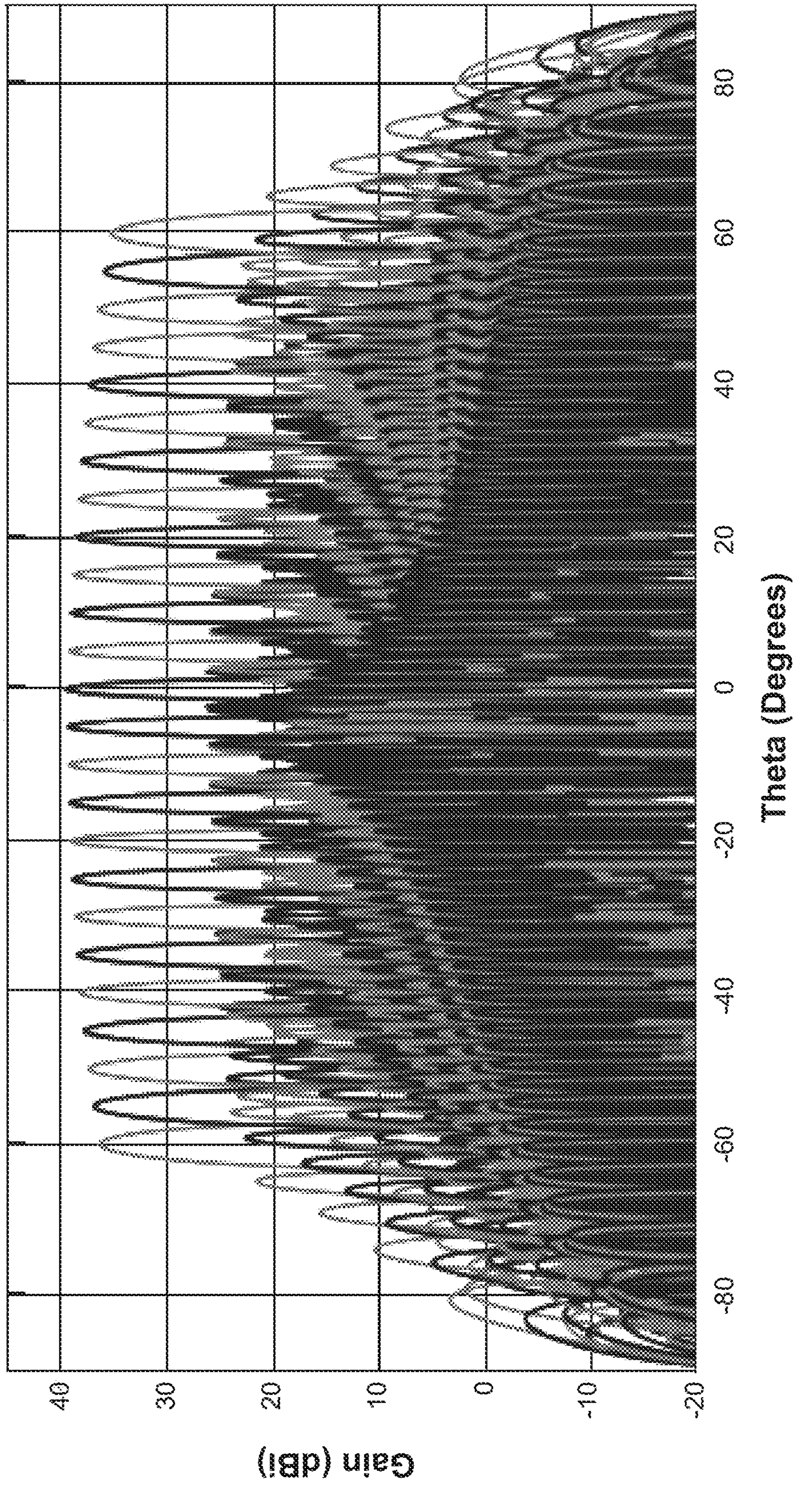
FIG. 10 is a plot showing beam scanning for the low profile metasurface.

FIG. 10 shows the beam steered from 0° to ±60° for 74×74 element array as shown in FIGS. 4E and 6. The scan loss for ±60° scanning is below 4.2 dB. The simulated peak efficiency is above 50%. As discussed earlier, aperture efficiency can vary based on the choice of varactor diode 410 because varactors with higher resistance degrade aperture efficiency.

An ingenious feeding mechanism, a low-cost phase shifting element, a simple antenna control module with low voltage error, and low power consumption make this antenna 200 an excellent candidate for next-generation wireless communications (e.g., satcom, 5G, and beyond).

While the exemplary preferred embodiments of the present invention are described herein with particularity, those skilled in the art will appreciate various changes, additions, and applications other than those specifically mentioned, which are within the spirit of this invention.

The invention claimed is:

1. A method of steering a beam comprising:
- providing a flat feed array;
- generating plane waves with the feed array;
- providing a metasurface comprising an array of unit cells having varactors, the unit cells configured to steer beams according to capacitance of the varactors;
- impinging the plane waves on the metasurface; and
- varying the capacitance of the varactors to steer beams resulting from the plane waves.

2. The method of claim 1, further comprising the step of separating the flat feed array and the metasurface by a distance on the order of a longest wavelength the steerable antenna is configured to amplify.

3. The method of claim 2 wherein the step of providing a metasurface further comprises the step of configuring the unit cells in layers separated by a distance on the order of ¼ of the longest wavelength the steerable antenna amplifies.

4. The method of claim 3 wherein the step of configuring the unit cells in layers provides four layers.

5. The method of claim 3 wherein each layer includes a substrate and each unit cell includes a conductive overlay on each substrate.

6. The method of claim 2 wherein the step of controlling varactor capacitances further comprises the step of using a single DAC to control switches attached to the varactors.

7. The method of claim 1 wherein the step of providing the metasurface comprising an array of unit cells provides four spaced apart layers, each layer including a substrate and each unit cell including a conductive overlay on each substrate.

8. The method of claim 7 wherein the conductive overlay includes an inner copper ring and an outer copper ring and the varactors is are disposed between the inner copper ring and an outer copper ring.

9. The method of claim 1 wherein the step of providing a metasurface further comprises the step of configuring the unit cells in layers separated by a distance on the order of ¼ of the longest wavelength the steerable antenna amplifies.

10. The method of claim 9 wherein the step of configuring the unit cells in layers provides four spaced apart layers.

11. The method of claim 10 wherein each layer includes a substrate and each unit cell includes a conductive overlay on each substrate.

12. The method of claim 9 further comprising the step of separating the flat feed array and the metasurface by a distance on the order of a longest wavelength the steerable antenna is configured to amplify.

13. The method of claim 1 wherein the step of controlling varactor capacitances further comprises the step of using a single DAC to control switches attached to the varactors.

14. The method of claim 13 wherein the step of configuring the unit cells in layers provides four spaced apart layers.

15. The method of claim 14 wherein the layers are separated by a distance on the order of ¼ of the longest wavelength the steerable antenna amplifies.

16. The method of claim 13 wherein each layer includes a substrate and each unit cell includes a conductive overlay on each substrate.

17. The method of claim 1 further comprising the steps of:

providing a bias layer; and separately controlling varactor capacitances with the bias layer such that each unit cell independently shifts the phase of electromagnetic waves.

18. The method of claim 1 further comprising the steps of:

providing a bias layer configured as a patch array with patches including an RF choke having a radial stub and a ¼λ transmission line.

* * * * *